United States Patent [19]

Sieben

[11] Patent Number: 4,541,024
[45] Date of Patent: Sep. 10, 1985

[54] MAGNETIC-TAPE GUIDE ARRANGEMENT FOR A CASSETTE AND A MAGNETIC-TAPE CASSETTE APPARATUS

[75] Inventor: Joannes H. F. C. Sieben, Eindhoven, Netherlands

[73] Assignee: U.S. Philips Corporation, New York, N.Y.

[21] Appl. No.: 470,842

[22] Filed: Feb. 28, 1983

[30] Foreign Application Priority Data

Mar. 11, 1982 [NL] Netherlands ........................ 8201009

[51] Int. Cl.³ .................... G11B 15/66; G11B 5/52; G11B 23/04
[52] U.S. Cl. .................... 360/85; 242/199; 360/95; 360/132
[58] Field of Search .................... 360/85, 132, 137, 93, 360/95; 242/199, 200

[56] References Cited

U.S. PATENT DOCUMENTS 3,821,805 6/1974 Serizawa ............................. 360/85
4,235,395 11/1980 Wardenaar et al. ................ 360/132
4,418,373 11/1983 Fujimori et al. .................... 360/132

FOREIGN PATENT DOCUMENTS 1655985 10/1952 Fed. Rep. of Germany .
2102382 2/1983 United Kingdom ................ 360/132

Primary Examiner—Stuart N. Hecker
Assistant Examiner—David J. Severin
Attorney, Agent, or Firm—David R. Treacy

[57] ABSTRACT

A magnetic-tape cassette for use with a magnetic-tape cassette apparatus of the kind comprising tape-extraction means for drawing a loop of tape from the cassette housing for cooperation with the magnetic heads of the apparatus. The cassette housing, containing two side-by-side reel hubs (16 and 17), has two apertures (7 and 8) in the front through which the tape (18) enters and leaves the housing. The apertures are bounded on one side by two tape supports (19 and 20) which support a portion of the tape that extends across the front of the housing between the aperture, and on the opposite side by the front ends of the side walls (4 and 5) of the housing. The geometry of various parts of the cassette is such that when the cassette has been placed on the apparatus and in the tape has been drawn from the cassette housing, the tape extends directly between the reel hubs and the exterior of the housing without the sides of the tape being in contact with any guide means or other parts inside the housing.

9 Claims, 2 Drawing Figures

MAGNETIC-TAPE GUIDE ARRANGEMENT FOR A CASSETTE AND A MAGNETIC-TAPE CASSETTE APPARATUS

BACKGROUND OF THE INVENTION

The invention relates to a magnetic-tape cassette for use with a magnetic-tape cassette apparatus comprising tape-extraction means which, when a cassette is in position on the apparatus, are operable to draw a loop of tape from the cassette for cooperating with a magnetic head or heads on the apparatus; and more particularly to such a cassette comprising a housing having two parallel major walls and two side walls and a rear wall which extends between the major walls at the peripheries thereof, two reel hubs which are rotatable in the housing about axes perpendicular to the major walls of the housing, and a magnetic tape carrier on the hubs, the tape being secured at its ends to the hubs and being unwound from one hub and wound onto the other hub in the operation of the cassette apparatus.

The cassette has two apertures in the front of the housing through which the tape leaves and re-enters the housing while travelling from one reel hub to the other. Two tape supports each define a part of the boundary of an associated one of the front apertures and, when the cassette is not in use, support a portion of the tape that extends across the front of the housing externally between the apertures. The tape inside the housing extends directly between each tape support and an associated one of the reel hubs. A recess formed in the front of the housing between the apertures permits the tape-extraction means of the cassette apparatus, when the cassette is in position on the apparatus, to engage behind the portion of the tape that extends across the front of the housing. The recess is formed by a recess of recesses in the front edge or edges of one or both of the major walls of the housing and is bounded by a wall which extends between the major walls and which has two side wall portions and an intermediate portion extending between the side portions. Each of these side wall portions and the adjacent side wall of the housing bounds a passage in the housing through which the tape passes and which terminates in a respective one of said apertures.

Such a magnetic-tape cassette is known from U.S. Pat. No. 4,235,395 and is widely used in video cassette equipment of the V2000 system. Such magnetic-tape cassette equipment comprises tape-extraction means, for example, in the form of pins or rollers, which when the cassette has been inserted are situated in the recess in the front of the cassette housing, behind the portion of the tape that extends across the front of the housing.

For a more universal use of the cassette and, in particular, a satisfactory operation in the case of a compact construction it is desirable to make the recess in the cassette housing as wide as possible, within the constructional specifications of the cassette. This provides a greater freedom of construction and/or movement, regardless of the dimensions of the housing, for the tape-extraction means with which the apparatus is equipped and by means of which the magnetic tape is drawn from the cassette housing to allow it to cooperate with the magnetic heads of the apparatus, especially when the heads are arranged in a head drum at some distance from the cassette.

When drawn from the cassette housing the magnetic tape in the known cassette cannot become disengaged from the two tape supports at the front of the housing during operation. In the known cassette these tape supports are arranged at the location of the comparatively narrow apertures in the front of the housing, which are disposed at some distance from the side walls of the housing. Because of this arrangement, during operation of the cassette apparatus as the tape as enters and leaves the cassette housing it is always guided by the tape supports of the cassette regardless of the diameters of the rolls of tape on the reel hubs and/or the location of the tape-extraction means relative to the aperture. As a result of this the tape supports have to be manufactured very accurately. Such accuracy can only be achieved at high cost by means of the injection-molding techniques with which the cassette housing is manufactured. Moreover, as a result of the abrasive action of the magnetic tape, the tape supports are generally provided with a hard-metal surface. This surface is also a cost-raising factor.

Even if the two tape supports in the known cassette could be dispensed with, the magnetic tape would still be in contact with wall portions as a result of the arrangement of the side and intermediate portions of the wall of the recess in the front of the cassette housing relative to each other and the position of the apertures in the front of the cassette housing relative to the side walls of the housing, so that these wall portions would influence the tape transport.

SUMMARY OF THE INVENTION

According to the invention a magnetic-tape cassette as described in the first two paragraphs is characterized in that each of the tape supports is formed integrally with an associated one of the side wall portions at the end thereof which is remote from the intermediate wall portion, and each of the front apertures is bounded on one side by the respective tape support and on the opposite side by the front end of the adjacent side wall of the housing. The walls are arranged such that a first plane which is tangential to one of the reel hubs on the side thereof remote from the other reel hub and which touches the tape support associated with said one of the reel hubs, and a second plane which is tangential to the outermost turn of the roll of tape on this one of the reel hubs on the side of the roll remote from the other reel hub when the tape is wound fully onto this one of the reel hubs and which touches the front end of the side wall of the housing which is adjacent this one of the reel hubs, intersect one another outside the housing at the front thereof. Similarly, a third plane which is tangential to the other reel hub on the side thereof remote from said one of the reel hubs and touches the tape support associated with said other reel hub, and a fourth plane which is tangential to the outermost turn of the roll of tape on the other reel hub on the side of the roll remote from said one of the reel hubs when the tape is wound fully onto the other reel hub and which touches the front end of the side wall of the housing which is adjacent said other reel hub, intersect one another outside the housing at the front thereof.

It is to be understood, of course, that when the tape is wound fully onto either reel hub, there will still be a portion of the tape extending from the roll of tape on that reel hub to the other reel hub.

With the construction according to the invention a magnetic-tape cassette need not be provided with active tape-guide means and can therefore be manufactured comparatively cheaply. This is of importance in view of the large quantities in which such cassettes are manufactured. With the cassette according to the invention the only tape-guide means required are those provided on the magnetictape cassette apparatus, so that during operation the tape transport is determined solely by the tape-guide means of the apparatus. Thus, the cassette according to the invention allows the manufacturer of such equipment to determine the accurate lace-up of the tape past the magnetic heads without this lace-up being disturbed by the subsequent use of less accurate cassettes. In the cassette according to the invention the tape supports still allow a portion of the magnetic tape to extend tautly between the tape supports when the cassette is not in use. This is desirable for storage of the cassette and when placing the cassette on or in the apparatus. As a result of the construction of the cassette according to the invention the tape supports will not affect the lace-up during operation.

In the cassette according to the invention, since the apertures in the front of the cassette housing are located directly adjacent the front ends of the side walls of the housing, the distance between the side portions of the wall of the recess in the front of the housing, and therefore the width of this recess, can be maximal.

It is known from German Gebrauchsmuster No. 1,655,985 to form apertures in the front of a cassette housing at locations such that during operation the tape extending from the reel hubs is not in contact with any part of the front wall of the housing, in order to minimise the friction on the tape. The apertures in this known cassette, however, are situated at a comparatively large distance from the side walls of the housing. Also, various features of the cassette according to the invention, in particular the recess in the front of the cassette housing and the passages formed by the side portions of the wall of this recess and the side walls of the housing, are not present in this known cassette, with the result that it is not possible for tape-extraction means of a cassette apparatus to engage behind the portion of the tape that extends across the front of the cassette housing, and there is a possibility of the lace-up being disturbed by contact of the tape with parts inside the cassette.

To inhibit the ingress of dust into the housing of the cassette according to the invention, each of the side portions of the wall of the recess in the front of the housing is preferably imperforate. This is another advantage of the integration of the tape supports with the side portions of the wall of the recess.

In one embodiment of the cassette according to the invention, guides for guiding a respective one of the edges of the tape are provided on one or each of the major walls of the housing adjacent the tape supports, the guides having conically curved convex surfaces arranged coaxially with cylindrically curved convex surfaces of the tape supports, and the distance from the guides on the one or each major wall to the other major wall being greater than the width of the tape.

The invention also provides a combination comprising a magnetic-tape cassette apparatus comprising tape-extraction means which, when a cassette is in position on the apparatus, are operable to draw a loop of tape from the cassette for cooperation with a magnetic head or heads on the apparatus, and a magnetic-tape cassette according to the invention, characterized in that the apparatus comprises two tape-guiding elements which, when the cassette is in position on the apparatus and a loop of tape has been drawn from the cassette housing by the tape-extraction means of the apparatus, are disposed one between said first and second planes and the other between said third and fourth planes to provide guidance for the tape outside the cassette housing, the arrangement being such that when the tape is in contact with these tape-guiding elements, both sides of the tape between said elements and the rolls of tape on the reel hubs of the cassette are free of any other contact. This ensures that the tape-guiding elements of the apparatus are effectively adapted to the absence of tape-guiding means in the cassette during operation of the apparatus.

The tape-guiding elements may form part of the tape-extraction means of the apparatus.

An embodiment of the cassette in accordance with the invention will be described in more detail, by way of example, with reference to the drawings.

DESCRIPTION OF THE PREFERRED EMBODIMENT

Figure 1:
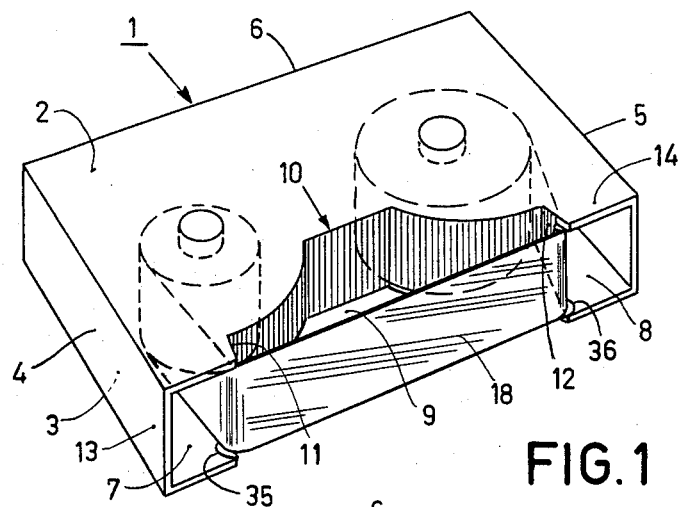
FIG. 1 is a perspective view of a cassette in accordance with the invention.
Figure 2:
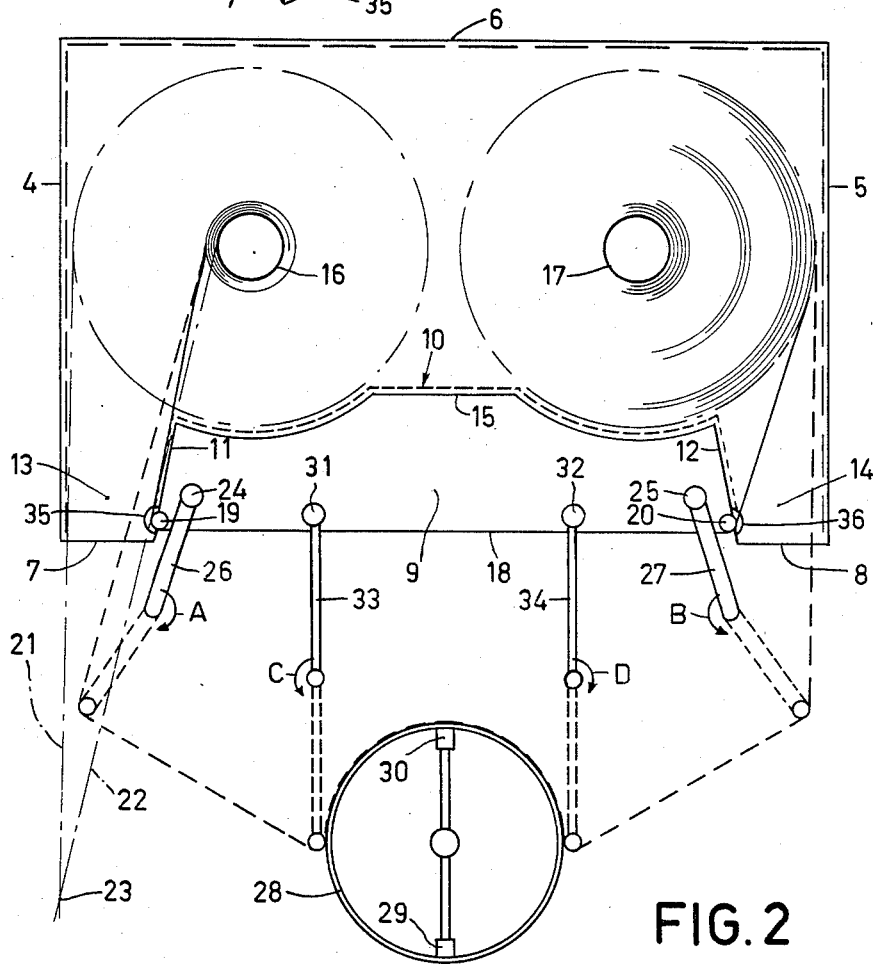
FIG. 2 is a sectional view of the cassette shown in FIG. 1 when it is in the operating position on an apparatus whose parts which are relevant to the present invention are shown schematically.

The magnetic-tape cassette 1 shown in FIGS. 1 and 2 comprises a housing with two major walls 2 and 3 lying in parallel planes. Two side walls 4 and 5 and a rear wall 6 extend between the major walls at the peripheries thereof. In the front of the housing, adjacent to front ends of the side walls 4 and 5 are substantially rectangular apertures 7 and 8, respectively. In the front of the housing also, between the apertures 7 and 8, is a recess 9, which in this embodiment is formed by recesses in the front edges of the two major walls 2 and 3. In the case of a non-reversible cassette which is always placed on a magnetic-tape cassette apparatus with its major wall 3 facing the apparatus, the recess 9 could be formed by a recess in the wall 3 only. The recess 9 is bounded by a wall 10 which extends between the major walls 2 and 3 in order to inhibit the ingress of dust into the interior of the housing and to provide adequate resistance to flexure of the major walls of the housing. Adjacent each of the apertures 7 and 8 the wall 10 of the recess 9 has a side portion 11 and 12, respectively. These side wall portions 11 and 12 and the adjacent side walls 4 and 5 respectively of the housing bound passages 13 and 14 respectively in the housing, which passages terminate in the aperture 7 and 8 respectively. The wall 10 further comprises an intermediate portion 15 extending between the side portions 11 and 12.

Inside the housing two reel hubs 16 and 17 are rotatably supported between the major walls 2 and 3 so as to be rotatable about axes which extend perpendicularly to these walls. The major walls are provided with the usual openings through which the hubs can be driven by drive means (not shown) on the magnetic-tape cassette apparatus. A magnetic tape 18 is connected at its ends to the reel hubs and, as is shown in FIG. 2, is wound around the hubs 16 and 17 to form rolls of tape on the hubs. On the front end of each of the side portions 11 and 12 of the wall 10 of the recess 9 is a fixed support 19 and 20, respectively. These tape supports comprise cylindrically curved convex surfaces and are formed integrally with the side wall portions 11 and 12.

The supports 19 and 20 bound the apertures 7 and 8 respectively at one side thereof, the apertures each being bounded at the opposite side by the front end of the side wall 4 and 5 respectively of the housing. In the non-operative condition of the cassette, as shown in FIG. 1 and as indicated by the full lines in FIG. 2, a portion of the magnetic tape extends between the tape supports 19 and 20 across the front of the housing. The tape inside the housing extends directly between the tape supports 19 and 20 and the reel hubs 16 and 17 respectively. Each of the passages 13 and 14 is entirely free from any tape-guide means. The tape supports 19 and 20 primarily have a passive function, namely, to support the portion of the magnetic tape which extends across the front of the housing where the recess 9 is formed. To protect this portion of the magnetic tape when the cassette is not in use a cover (not shown) is pivotally mounted on the side walls 4 and 5 of the housing so as to enclose the front part of the cassette. When the cassette is positioned on the cassette apparatus the cover is swung open automatically by means provided on the apparatus for this purpose and expose the magnetic tape and the recess 9. The tape supports 19 and 20 may also assist in a smooth tape transport during fast winding of the magnetic tape when the tape is being wound in the fast forward or reverse mode within the cassette housing. For this purpose the tape supports 19 and 20 may be provided with a metal wall.

In the passages 13 and 14 there are no means for guiding the tape, so that the tape extends directly between the tape supports 19 and 20 and the reel hubs 16 and 17 respectively as already mentioned.

The construction of the cassette and the geometry of various parts thereof are such that, considering first the left-hand half of the cassette as viewed in the drawings, a plane 22 which is tangential to the reel hub 16 on the side thereof remote from the reel hub 17 and which touches the tape support 19, and a plane 21 which is tangential to the outermost turn of the roll of tape on the reel hub 16 on the side of the roll remote from the reel hub 17 when the tape is wound fully onto the hub 16 and which touches the front end of the side wall 4 of the cassette housing, intersect one another at a point 23 outside the housing at the front thereof. Similarly for the right-hand half of the cassette, the two planes (not shown) which are tangential to the reel hub 17 on the side thereof remote from the reel hub 16 and to the outermost turn of the roll of tape on the reel hub 17 on the side of the roll remote from the reel hub 16 when the tape is wound fully onto the hub 17, and which touch the tape support 20 and the front end of the side wall 5 of the housing respectively, intersect at a point outside the housing at the front thereof corresponding to the point 23.

FIG. 2 shows diagrammatically the tape-extraction means and the head drum of a video cassette apparatus. The tape-extraction means comprise two tape-extracting elements in the form of rollers 24 and 25 carried on pivotal arms 26 and 27 respectively. When the cassette is placed on the apparatus the rollers 24 and 25 enter the recess 9 in the front of the cassette housing behind the portion of the tape 18 that extends across the front of the housing, as shown in full lines in FIG. 2. In the operation of the tape-extraction means, the rollers 24 and 25 are swung round on the pivotal arms 26 and 27 in the directions of the arrows A and B respectively, first to engage the back of the tape 18 and then to draw a loop of tape out of the housing, as indicated by the broken lines in FIG. 2. The rollers 24 and 25 are swung round until they reach final positions in front of the housing, as shown in broken lines in FIG. 2, in which positions the roller 24 is situated between the tangential planes 21 and 22 associated with the reel hub 16 and the roller 25 is situated between the corresponding tangential planes associated with the reel hub 17. With the rollers 24 and 25 in these positions, in which positions they serve as tape-guiding elements, the tape 18, throughout the whole of its transfer from one reel hub to the other, travels between the hubs and the exterior of the housing through the passages 13 and 14 without either side of the tape contacting any guide means or touching any other part of the cassette.

Part of the loop of tape drawn from the cassette housing is laid around the cylindrical surface of the head drum 28 of the cassette apparatus through an angle of at least 180° by further rollers 31 and 32 on the apparatus which also enter the recess 9 in the front of the cassette housing when the cassette is placed on the apparatus, as shown in full lines in FIG. 2. These rollers are carried on pivotal arms 33 and 34 respectively and can be swung on these arms in the directions of the arrows C and D respectively from the positions shown in full lines in FIG. 2 to the positions shown in broken lines to lay and subsequently guide the tape 18 around the drum 28, which contains rotary magnetic heads 29 and 30 for recording and/or playing-back signals on and/or from the tape 18.

To facilitate the drawing of a loop of tape from the cassette housing, the recess 9 in the front of the housing should be as wide as possible, the width of the recess being its dimension across the front of the housing. This width is determined by the distance between the tape supports 19 and 20, which in turn is determined by the proximity of the apertures 7 and 8 to the side walls 4 and 5 of the housing. For ensuring that the two planes of each of the two pairs of tangential planes referred to above intersect one another at a suitable distance from the front of the housing, the shape of the side portions 11 and 12 of the wall 10 of the recess 9, the location of the tape supports 19 and 20, and the location of the apertures 7 and 8 directly adjacent the front ends of the side walls 4 and 5 of the housing are of particular importance.

The apparatus shown in FIG. 2 is a video cassette apparatus. The cassette in accordance with the invention is equally suitable for use with an audio cassette apparatus in which a loop of tape is drawn from the cassette housing by tape-extraction means on the apparatus for cooperation with stationary magnetic heads on the apparatus.

In this respect it is essential that during operation the path of the tape between the reel hubs is determined not by tape-guide means in or on the cassette but only by guide means on the apparatus, which is possible if there is sufficient space for a tape-guide means of the apparatus between the two planes of each of the two pairs of tangential planes referred to above. This construction has the advantage that during mass production of the cassettes, the elements, such as guide rollers, which determine the lace-up are not critical. These elements may be dispensed with, so that the cassette can be cheaply produced. Only the two passive tape supports 19 and 20 on the side portions 11 and 12 of the wall 10 of the recess 9 are required, which have a function only when the magnetic tape has been drawn back into the cassette housing, the function being to form the span of tape which extends tautly across the front of the housing. When the tape has been drawn from the housing by the rollers 24 and 25 of a cassette apparatus and is subsequently in motion, the supports 19 and 20 are not touched by the tape regardless of the diameters of the rolls of tape on the reel hubs. The manufacturer of the cassette apparatus for use with a cassette in accordance with the invention can determine the path of the tape past the magnetic heads without having to allow for manufacturing tolerances of the cassette.

For keeping the edges of the tape at the desired levels relative to the major walls 2 and 3 of the cassette housing during the brief period in which the tape is being drawn out of or back into the housing and the rollers 24 and 25 of the cassette apparatus are moving between their inoperative and operative positions (shown in full and broken lines respectively in FIG. 2), tape-edge guides 35 and 36 may be provided on the inner side of each of the major walls 2 and 3 at the ends of the tape supports 19 and 20 respectively. These guides preferably have conically curved convex surfaces arranged coaxially with the cylindrically curved surfaces of the respective tape supports. If the distance between the guides on the major wall 2 and the guides on the major wall 3 is greater than the width of the tape, the guides will not affect the lace-up of the tape in the cassette apparatus and in the cassette during operation after the tape has been drawn from the cassette housing. If the cassette is non-reversible it may be sufficient to provide tape-edge guides 35 and 36 on the major wall 3 only, assuming this to be the wall which will face the apparatus, in which case the distance between these guides and the major wall 2 should be greater than the width of the tape.

What is claimed is:

1. A magnetic-tape cassette for use with a magnetic-tape cassette apparatus comprising tape-extraction means which, when a cassette is in position on the apparatus, are operable to draw a loop of tape from the cassette for cooperation with a magnetic head or heads on the apparatus, the cassette comprising a housing having two parallel major walls and two side walls and a rear wall which extend between the major walls at the peripheries thereof, two reel hubs which are rotatable in the housing about axes perpendicular to the major walls of the housing and which carry a magnetic tape, the tape being secured at its ends to the hubs and being unwound from one hub and wound onto the other hub in the operation of the cassette apparatus, two apertures in the front of the housing through which the tape leaves and re-enters the housing while travelling from one reel hub to the other, two tape supports each of which defines a part of the boundary of an associated one of said apertures and which, when the cassette is not in use, support a portion of the tape that extends across the front of the housing externally thereof between said apertures, the tape inside the housing then extending directly between each tape support and an associated one of the reel hubs, and a recess formed in the front of the housing between said apertures to permit the tape-extraction means of the cassette apparatus, when the cassette is in position on the apparatus, to engage behind said portion of the tape that extends across the front of the housing, the recess being formed by a recess or recesses in the front edge or edges of one or both of the major walls of the housing and being bounded by a wall which extends between said major walls and which has two side portions and an intermediate portion extending between the side portions, each of these side wall portions and the adjacent side wall of the housing bounding a passage in the housing through which the tape passes and which terminates in a respective one of the apertures, characterized in that each of said tape supports is formed integrally with an associated one of said side wall portions at the end thereof which is remote from said intermediate wall portion, and each of said apertures is bounded on one side by the respective tape support and on the opposite side by the front end of the adjacent side wall of the housing, and in that a first plane which is tangential to one of the reel hubs on the side thereof remote from the other reel hub and which touches the tape support associated with said one of the reel hubs, and a second plane which is tangential to the outermost turn of the roll of tape on said one of the reel hubs on the side of the roll remote from the other reel hub when the tape is wound fully onto said one of the reel hubs and which touches the front end of the side wall of the housing which is adjacent said one of the reel hubs, intersect one another outside the housing at the front thereof, and a third plane which is tangential to said other reel hub on the side thereof remote from said one of the reel hubs and touches the tape support associated with said other reel hub, and a fourth plane which is tangential to the outermost turn of the roll of tape on said other reel hub on the side of the roll remote from said one of the reel hubs when the tape is wound fully onto said other reel hub and which touches the front end of the side wall of the housing which is adjacent said other reel hub, intersect one another outside the housing at the front thereof.

2. A magnetic-tape cassette as claimed in claim 1, characterized in that each of the side portions of the wall of the recess in the front of the housing is imperforate.

3. A magnetic-tape cassette as claimed in claim 1 or 2, characterized in that guides for guiding a respective one of the edges of the tape are provided on one or each of the major walls of the housing adjacent the tape supports, the guides having conically curved convex surfaces arranged coaxially with cylindrically curved convex surfaces of the tape supports, and the distance from the guides on the one or each major wall to the other major wall being greater than the width of the tape.

4. A combination comprising a magnetic-tape cassette apparatus comprising tape-extraction means which, when a cassette is in position on the apparatus, are operable to draw a loop of tape from the cassette for cooperation with a magnetic head or heads on the apparatus and a magnetic-tape cassette as claimed in claim 1 or 2 for use with the apparatus, characterized in that the apparatus comprises two tape-guiding elements which, when the cassette is in position on the apparatus and a loop of tape has been drawn from the cassette housing by the tape-extraction means of the apparatus, are disposed one between said first and second planes and the other between said third and fourth planes to provide guidance for the tape outside the cassette housing, the arrangement being such that when the tape is in contact with these tape-guiding elements, both sides of the tape between said elements and the rolls of tape on the reel hubs of the cassette are free of any other contact.

5. A combination as claimed in claim 4, characterized in that the tape-guiding elements form part of the tape extraction means of the apparatus.

6. A combination comprising a magnetic-tape cassette apparatus comprising tape-extraction means which, when a cassette is in position on the apparatus, are operable to draw a loop of tape from the cassette for cooperation with a magnetic head or heads on the apparatus and a magnetic-tape cassette as claimed in claim 3 for use with the apparatus, characterized in that the apparatus comprises two tape-guiding elements which, when the cassette is in position on the apparatus and a loop of tape has been drawn from the cassette housing by the tape-extraction means of the apparatus, are disposed one between said first and second planes and the other between said third and fourth planes to provide guidance for the tape outside the cassette housing, the arrangement being such that when the tape is in contact with the tape-guiding elements, both sides of the tape between said elements and the rolls of tape on the reel hubs of the cassette are free of any other contact.

7. A combination as claimed in claim 6, characterized in that the tape-guiding elements form part of the tape-extraction means of the apparatus.

8. A magnetic tape cassette comprising:
two reel hubs having axes parallel to each other,
a length of magnetic tape having ends secured to respective hubs, and wound around and extending between said hubs, and
a housing in which said reel hubs are mounted for rotation about said axes, said housing having a recessed front, two side walls, and two cassette tape guides arranged at the front edge of respective wall portions spaced from and between said side walls so as to define respective tape passages such that, when not inserted into a cassette apparatus for use, the tape passes through said passages, over and is guided by said guides, and extends across said front; and such that during insertion into an apparatus, loading guide means on the apparatus can enter said recess behind the tape and between said passages and withdraw a portion of the tape from within the cassette to position the tape in an operating position in which the tape is guided by apparatus guides outside the cassette, for scanning by a magnetic head,
characterized in that said housing is further arranged such that when the tape is in said operating position, the tape is free from contact with any surfaces of said housing.

9. A cassette as claimed in claim 8, characterized in that said housing side walls extend parallel to said axes, said guides being spaced from and disposed between said walls so as to define two substantially rectangular front apertures through which the tape passes; and said guides and wall portions are so proportioned and spaced from said side walls that tape passing through an aperture from a fully wound hub to an apparatus guide positioned at a fixed location outside the cassette is free from contact with the respective adjacent side wall, and tape passing through an aperture from a fully unwound hub to an apparatus guide at said fixed location is free from contact with the respective adjacent cassette tape guide and wall portion.

* * * * *